E. E. LEFER.
VALVE.
APPLICATION FILED JULY 10, 1911.
1,051,602.
Patented Jan. 28, 1913.
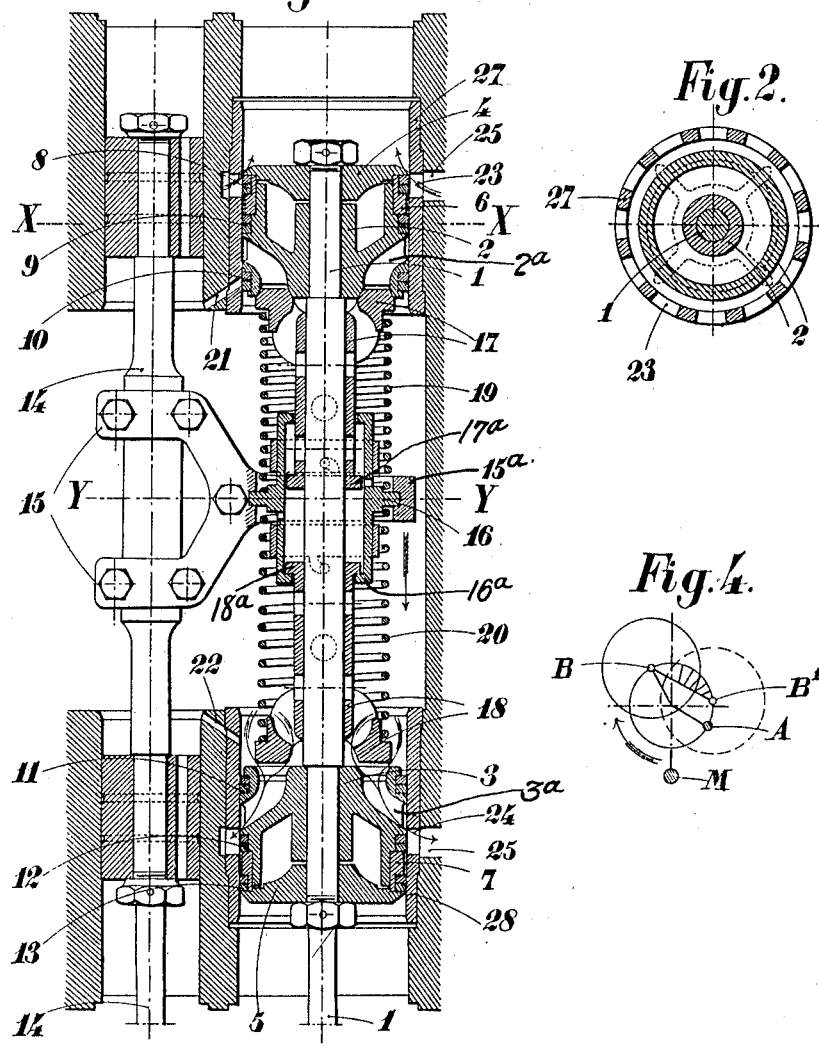
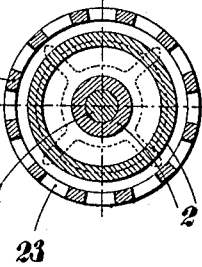
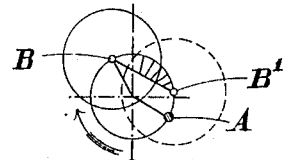
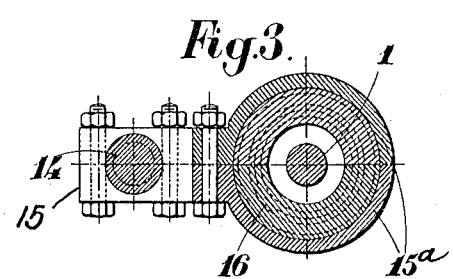
Witnesses
Inventor.

UNITED STATES PATENT OFFICE.

EUGÈNE EMILE LEFER, OF ST.-DENIS, FRANCE, ASSIGNOR TO THE SOCIÉTÉ ANONYME DES ETABLISSEMENTS DELAUNAY-BELLEVILLE, OF ST.-DENIS, FRANCE, A CORPORATION OF FRANCE.

VALVE.

1,051,602.  Specification of Letters Patent.  Patented Jan. 28, 1913.

Application filed July 10, 1911. Serial No. 637,751.

*To all whom it may concern:*

Be it known that I, EUGÈNE EMILE LEFER, citizen of the French Republic, residing at St.-Denis, Department of the Seine, in France, have invented certain new and useful Improvements in and Relating to Valves, of which the following is a specification.

This invention relates to improvements in valve mechanism, and particularly to that type which is used in connection with expansion engines that are subjected to varying loads. In such cases, it is desirable to admit more or less of the elastic fluid to the cylinder, in proportion to the amount of work which is imposed upon the engine.

The object of the invention is to provide such a mechanism which can be controlled to vary the admission of the expansion fluid in such a manner that the greatest amount of such fluid will be admitted when the load is the maximum, and the least amount of the fluid will be admitted when the load is the minimum. To this end, a mechanism is provided having suitable slide valves which directly control the admission to, and exhaust from, the cylinder. Coöperating with these slide valves are auxiliary valves which operate in timed relation to the said slide valves to open and close ports provided therein. Means are provided by which the auxiliary valves can be timed and regulated in accordance with the load, to open and close said ports at the proper time, thereby controlling the admission of the fluid into the expansion chamber.

The accompanying drawings are used to illustrate the invention, but it will be understood that various modifications can take place, without departing from the spirit or scope of the invention.

In the drawings, Figure 1 is a horizontal section of a slide valve mechanism embodying the invention. Fig. 2 is a section taken on the line $x$—$x$ of Fig. 1. Fig. 3 is a section taken on the line $y$—$y$ of Fig. 1. Fig. 4 is a diagrammatic representation showing the relative positions of the piston, the slide valve eccentric, the auxiliary valve eccentric, and the displacement of the auxiliary valve eccentric due to adjustment.

Throughout these views, like reference characters refer to corresponding parts.

The eccentric A operates the valve stem 1 with a fixed stroke. Two slide valves 2 and 3 are disposed on said stem 1, which are provided with suitable ports $2^a$ and $3^a$, coöperating with the cylinder ports 23 and 25. Preferably sleeves 27 and 28 are interposed between the slide valves 2 and 3 and the cylinder wall, connecting passages 23 and 24 being provided in said sleeves to register with the cylinder ports. The construction of the slide valves may vary, but preferably they are of the detachable type. Counterblocks 4 and 5 are held against the valves' bodies 2 and 3, respectively, in such a way as to retain the packings 8, 9, 12 and 13 and render them removable when said counter blocks are themselves removed. Removable rings 6 and 7 are provided to further facilitate the retaining of the packings. A second eccentric of the adjustable type operates an auxiliary valve stem 14, which carries at a suitable point the yoke 15 secured rigidly thereto. The yoke is provided with a collar $15^a$ which engages the annular sliding member 16.

Loosely mounted on the valve stem 1 are the auxiliary valves 17 and 18, normally held at a maximum distance from the member 16 by the springs 19 and 20 which react against the collar $15^a$ of the yoke 15. The annular sliding member 16 engages shoulders $17^a$ and $18^a$ on the valves 17 and 18 respectively, to unseat the same at the proper time. In order to facilitate the unseating of the auxiliary valves 17 and 18, the passages 21 and 22 are provided, which conduct a quantity of live steam to the under side of said auxiliary valves 17 and 18, substantially at the time said valves are unseated, so that the pressure above and below the said auxiliary valves is balanced. This condition takes place when the passages $2^a$ and $3^a$ register with the auxiliary passages 21 and 22, thereby allowing the steam to flow to the under side of the auxiliary valves.

The operation of such a device is as follows: The valve stem 1 and consequently the slide valves 2 and 3 have a fixed stroke, and would normally admit the expansive fluid into the cylinder in definite amounts. Assuming the engine to be operating under full load and a large quantity of expansive fluid was desired in the cylinder to insure a powerful stroke. The eccentric which operates auxiliary valve stem 14 is then adjusted either by hand or an automatic governor until it will assume, at a certain point in the cycle of operation, the position B, as shown in Fig. 4, when the other working parts have assumed the respective relative positions, as shown in the same figure. When the parts have this operative relation, the stem 14 will operate in such timed relation to stem 1 that when the cylinder ports 25 are open, the slide valve ports 2ª and 3ª will also be open, due to the fact that the auxiliary valves 17 and 18 are caused to be fully unseated at this stage. Following the cycle of operation under these conditions, it will be seen from Figs. 1 and 4, that the valve stem 1 has almost completed its downward stroke. It has yet to open the ports 25, however. The valve stem 14 has completed its downward stroke and is nearly at the limit of its upward stroke, as can be seen by the position of B in Fig. 4. As the auxiliary valve 18 is now moving in an opposite direction to that of valve 3, the ports 3ª will be fully open during the entire period that port 25 is open. Obviously, then the expansive fluid is offered an unobstructed and clear path to the expansion chamber and a maximum amount is thereby admitted. It will be noted, however, that as valve stem 1 and consequently valve 2 have not completed their downward stroke, auxiliary valve 17 will be compelled to complete the stroke with them. To allow for this downward movement of auxiliary valve 17 when the similar valve 18 is still moving upward, the sleeves of each auxiliary valve have a sliding engagement in the annular member 16. Now, when the stem 1 has started its upward stroke, stem 14 has started its downward stroke. The auxiliary valve will therefore be seated on valve 3 and the ports 3ª will be closed. Although the stem 14 is making a downward stroke, the auxiliary valve 18 will be carried upward by the movement of valve 3, and the sleeve of said auxiliary valve will be telescoped into the annular member 16. It will be noted that the upper auxiliary valve 17 and slide valve 2, as represented in Fig. 1, are positioned to represent this stage of the cycle of operation. Still referring to the lower valves 3 and 18, it will be seen that when the valve stem 1 starts its downward stroke, valve stem 14 will start its upward stroke, but due to the telescopic action which resulted when the parts were moving in the other direction respectively, the valve 18 will not be unseated from valve 3 until shoulders 18ª engage shoulders 16ª of the member 16. The spring 20 tends to keep the valve thus seated until the said shoulders contact and then the valve 18 will be unseated and carried in the opposite direction by annular member 16. When fluid is about to be admitted to the cylinder through lower port 25, upper port 25 is acting as an exhaust outlet and the upper slide valve 2 is serving as an exhaust valve. Now assume that the eccentric which operates rod 14 be so adjusted that it assumes the position B' with respect to the other parts. Then from Fig. 4 it will be seen that when A or the eccentric which operates rod 1 has completed its stroke and fully opened port 25, the eccentric B which operates rod 14 is still moving downward. Hence, as member 16 is moving downward while the port 25 is opened, the valve 18 will remain seated upon valve 3 and thereby close the ports 3ª during the entire period that ports 25 are open. Without further explanation of the operation under this adjustment, it will be obvious that the unseating of the valves 18 will take place when the rod 1 has started its downward stroke and the rod 14 has not quite completed its upward stroke. At such a point the shoulders 18ª and 16ª will engage to unseat the valve 18. Under these conditions, the opening of the ports 3ª by such unseating of the valve will do no good, so for this adjustment of the eccentric the admission will be the minimum, since the ports 3ª will be fully closed when inlet ports 25 are open. It is evident then that any intermediate adjustment of the eccentric between the points B and B' will affect the timed coöperation of the valves. The auxiliary valves can thereby be made to allow any desired amount of fluid to pass through the slide valve and inlet port into the cylinder, when said port is fully opened by the slide valve.

I claim:—

1. In a valve mechanism for expansion engines, a main valve, an auxiliary valve coöperating with said main valve, means to impart a definite throw to the main valve, and means to actuate said auxiliary valve, said means adapted to permit the auxiliary valve to travel with and remain seated on the main valve during part of each reciprocation of the latter and to retard and reverse the movement of said auxiliary valve to open and close the same during the admission part of the stroke of the main valve.

2. In a valve mechanism for expansion engines, a main valve and an auxiliary valve coöperating with said main valve, reciprocating means to actuate the main valve, means reciprocating in relatively opposite directions to the first-named means to actuate the auxiliary valve, and connections between said last-named means and said auxiliary valve which permit the latter to remain seated on the main valve when said reciprocating means are traveling toward each other and said connections adapted to unseat the auxiliary valve when said reciprocating means are traveling in opposite directions.

3. In a valve mechanism, a main valve and an auxiliary valve abutting said main valve seated thereon, means to move both valves in opposite directions which unseats the auxiliary valve, said means adapted to move said valves toward each other into contacting relation to thereby seat the auxiliary valve.

4. In a valve mechanism, a main valve and an auxiliary valve seated thereon, means to move both valves in opposite directions which unseats the auxiliary valve, said means adapted to move said valves toward each other to seat the auxiliary valve, and means whereby the auxiliary valve can complete the stroke with the main valve after said auxiliary valve has been seated.

5. In a valve mechanism, a main valve to coöperate with a suitable cylinder admission and exhaust port, means to move said main valve in one direction to open the port for exhausting purposes, passages in said main valve to coöperate with said port, said passages adapted to register with said port when the main valve is moved in the opposite direction by said means, an auxiliary valve coöperating with the main valve to close said passages, and means to unseat said auxiliary valve at substantially the same time that the said port is opened by the passages in the main valve, said last-named means adapted to permit the auxiliary valve to remain seated and move with the main valve during that part of the stroke when the said port is closed.

6. The combination with a main valve, of an auxiliary valve seated thereon, means imparting a definite throw to the main valve, and means to actuate said auxiliary valve, said last-named means comprising a reciprocating element, resilient means to hold the auxiliary valve spaced from said element, means to allow the auxiliary valve to move toward said element against the action of said resilient means so that when the main valve and said reciprocating element are moved toward each other, the auxiliary valve is seated and completes the stroke with the main valve and so that during one part of the contrary movements of the main valve and said reciprocating element the auxiliary valve will be unseated from the main valve.

7. The combination with a cylinder provided with a suitable port opening, of a main valve provided with a passage to control the flow of fluid through said port, means to actuate said main valve, an auxiliary valve seated on said main valve to close said passages, means to unseat said auxiliary valve at substantially the time of the opening of said port, said last-named means adapted to permit the auxiliary valve to remain seated during a part of the reciprocation of the main valve and move with said main valve, said last-named means being adjustable to vary the length of the seated period of the auxiliary valve, whereby said passages in the main valve are opened in timed relation to the opening of the cylinder port to vary the amount of motive fluid admitted to the cylinder.

In testimony whereof I have hereunto set my hand in presence of two subscribing witnesses.

EUGÈNE EMILE LEFER.

Witnesses:
H. C. COXE,
GEORGE BOUJY.

Copies of this patent may be obtained for five cents each, by addressing the "Commissioner of Patents, Washington, D. C."